United States Patent Office 2,744,131
Patented May 1, 1956

2,744,131

PROCESS FOR PREPARING THREO-1-PHENYL-1,3-DIACYLOXY - 2 - AMINO - PROPANE - HYDROCHLORIDES

Alberto Vercellone and Carlo Giuseppe Alberti, Milan, Italy, assignors to Farmaceutici Italia S. A., a corporation of Italy No Drawing. Application August 29, 1951, Serial No. 244,274

Claims priority, application Italy February 8, 1951

6 Claims. (Cl. 260—487)

It is known that the O,O-diacyl derivatives of threo-1-phenyl-2-amino-1,3-propanediol are of interest for a method of synthesizing threo - 1 - p.nitrophenyl - 2 - acylamino - 1,3 - propanediols, forming the object of a previous U. S. application filed by the applicants, Serial No. 244,273, filed August 29, 1951.

Now it has been found that under determined operating conditions it is possible to conduct the acylation of threo - 1 - phenyl - 2 - amino - 1,3 - propanediol and of its N - monoacyl - derivatives in a selective manner, viz. esterifying only the alcoholic groups after previous salifying of the amino group, and on that basis has been found the process for preparing threo - 1 - phenyl - 1,3 - diacyloxy - 2 - aminopropane hydrochlorides forming the object of the present invention.

The process according to the invention is essentially characterized in that threo - 1 - phenyl - 2 - amino - 1,3 - propanediol or its N - monoacyl - derivatives are dissolved in an anhydrous solvent free from alcoholic or basic group such as ketones, aliphatic acids of low molecular weight, ethers, chlorinated and non-chlorinated hydrocarbons etc., are acidified with a solution of hydrochloric acid dissolved in an anhydrous solvent of the type mentioned hereinbefore and finally are acylated at temperatures lower than 35° C., with the chloride of a lower aliphatic acid.

Still according to the present invention, using as a starting product an N - monoacyl - derivative of threo - 1 - phenyl - 2 - amino - 1,3 - propanediol, acylation is effected only after the migration N—O of the acyl group in known manner by effect of the acidification with hydrochloric acid. Obviously in that case, it is also possible to separate first the hydrochloride of the O-monoacyl-derivative formed, and to subject it then to acylation under the conditions indicated hereinbefore.

The process according to the invention is illustrated by the following reaction scheme, where in Case I the starting compound is threo - 1 - phenyl - 2 - amino - 1,3 - propanediol and in Case II the respective N-monoacyl-derivative:

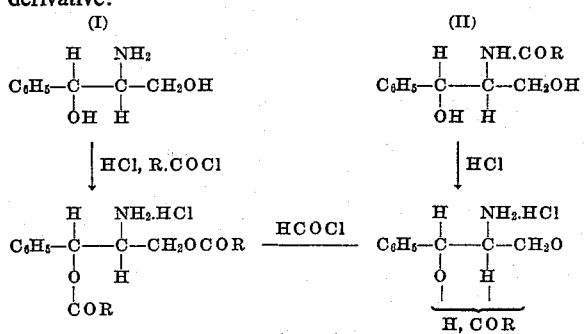

R=alkyl, dihaloalkyl (equal or different).

The threo - 1 - phenyl - 2 - amino - 1,3 - propanediol and its derivatives contain two asymmetric carbon atoms and can exist, therefore, in the racemic, levogyrate or dextrogyrate forms; it is understood, therefore, that in the present specification and in the appended claims, the racemic as well as the levogyrate and dextrogyrate forms are referred to.

The following examples of the invention are merely by way of illustration, not by way of limitation.

Example 1

20 g. of threo - 1 - phenyl - 2 - amino - 1,3 - propanediol are dissolved in 30 cc. of glacial acetic acid; 100 cc. of saturated solution of hydrochloric acid in glacial acetic acid and subsequently 100 cc. of acetyl chloride are added and the whole is left at rest one night. Then it is diluted with 500 cc. of ether to make the threo - 1 - phenyl - 1,3 - diacetoxy - 2 - aminopropane hydrochloride crystallize, which then is filtered off.

Example 2

20 g. of threo - 1 - phenyl - 2 - amino - 1,3 - propanediol are dissolved in 12 cc. of dichloroacetic acid plus 24 cc. of dioxano. Add 24 cc. of 15.4% solution of hydrochloric acid in ether, and then 24 cc. of dichloroacetyl chloride. After one night, dilute with anhydrous ether and let threo-1 - phenyl - 1,3 - bis dichloroacetoxy - 2 - aminopropane hydrochloride crystallize.

Example 3

20 g. of threo - 1 - phenyl - 2 - dichloroacetamino - 1,3 - propanediol are dissolved in 30 cc. of glacial acetic acid, 100 cc. of saturated solution of hydrochloric acid in glacial acetic acid are added and the whole is left at rest 12 hours, whereafter 100 cc. of acetyl chloride are added the whole is kept at rest for further 12 hours. It is diluted with 300 cc. of ether to complete the crystallization of the product, which then is filtered off. The hydrochloride of threo - 1 - phenyl - 1 - (or - 3 -) dichloroacetoxy - 3 - (or - 1 -) acetoxy - 2 - aminopropane, M. P. 167.5–168.5° C., is obtained.

Example 4

27.8 g. of threo - 1 - phenyl - 2 - dichloroacetamino - 1,3 - propanediol are dissolved in 200 cc. of anhydrous ether plus 20 cc. of anhydrous dioxane, and 40 cc. of 14%-solution of hydrochloric acid in anhydrous ether are added. After one night, the crystallized product is filtered off. It is the hydrochloride of threo - 1 - phenyl - 1 - (or - 3 -) dichloroacetoxy - 2 - aminopropane - 3 - (or -1-)ol, M. P. 186.5–187° C. 20 g. of this hydrochloride are suspended in 100 cc. of glacial acetic acid, 50 cc. of saturated solution of hydrochloric acid in glacial acetic acid and 100 cc. of acetyl chloride are added and the whole is kept in agitation for 48 hours. Then the hydrochloride of threo - 1 - phenyl - 1 - (or - 3 -) dichloroacetoxy-3- (or -1-) acetoxy-2-aminopropane obtained is filtered off.

Having now described our invention, what we claim is:

1. The process for preparing threo-1-phenyl-1,3-bisdichloroacetoxy-2-aminopropane hydrochloride, which comprises dissolving threo-1-phenyl-2-amino-1,3-propanediol in a mixture of dichloroacetic acid and dioxane, acidifying said solution with a solution of hydrochloric acid in ether, acylating at temperatures below 35° C. with dichloroacetyl chloride, diluting with anhydrous ether and crystallizing.

2. A process for preparing the 1,3-acetoxy-, 1,3-bisdichloroacetoxy-, 1-dichloroacetoxy-3-acetoxy- and 1-acetoxy-3-dichloroacetoxy compounds of threo-1-phenyl-2-amino-propane hydrochloride, which comprises treating, in an anhydrous medium and at a temperature not higher than 35° C., threo-1-phenyl-2-amino-1,3-propanediol with hydrochloric acid and an acetylating agent taken from the group consisting of acetyl chloride and dichloroacetylchloride.

3. A process for preparing threo-1-phenyl-1,3-diacetoxy-2-aminopropane hydrochloride, which comprises treating, in an anhydrous medium and at a temperature not higher than 35° C., threo - 1 - phenyl - 2 - amino - 1,3 - propanediol with an excess of hydrochloric acid and acetyl chloride.

4. A process for preparing threo-1-phenyl-1,3-bisdichloroacetoxy-2-aminopropane hydrochloride, which comprises dissolving threo-1-phenyl-2-amino-1,3-propanediol in a mixture of dichloroacetic acid and dioxane, treating the solution at a temperature not higher than 35° C. for about twelve hours with an excess of an etheric hydrochloric acid solution and dichloroacetyl chloride, diluting with ether and separating the crystalline product.

5. A process for preparing threo-1-phenyl-1-dichloroacetoxy-3-acetoxy-2-aminopropane hydrochloride, which comprises dissolving threo-1-phenyl-2-dichloroacetamino-1,3-propanediol in glacial acetic acid, treating the solution at a temperature not higher than 35° C. first for about twelve hours with an excess of a saturated solution of hydrochloric acid in glacial acetic acid and then for about another twelve hours with an excess of acetyl chloride added to the reaction mixture, diluting with ether to complete crystallization and separating the crystalline product.

6. A process for preparing threo-1-phenyl-1-dichloroacetoxy-3-acetoxy-2-aminopropane hydrochloride, which comprises dissolving threo-1-phenyl-2-dichloroacetamino-1,3-propanediol in a mixture of anhydrous ether and anhydrous dioxane, treating the solution at a temperature not higher than 35° C. for about twelve hours with an about 14% solution of hydrochloric acid in anhydrous ether, separating the resulting crystalline threo-1-phenyl-1(3)-dichloroacetoxy-2-amino-propane-3(1)-ol, suspending it in glacial acetic acid, adding a saturated solution of hydrochloric acid in glacial acetic acid and acetyl chloride, agitating for about forty-eight hours and separating the crystalline product.

References Cited in the file of this patent

UNITED STATES PATENTS

| | | |
|---|---|---|
| 2,483,884 | Crooks et al. | Oct. 4, 1949 |
| 2,483,885 | Crooks et al. | Oct. 4, 1949 |
| 2,538,764 | Crooks et al. | Jan. 23, 1951 |
| 2,538,765 | Crooks et al. | Jan. 23, 1951 |

FOREIGN PATENTS

| | | |
|---|---|---|
| 501,303 | Belgium | Mar. 15, 1951 |

OTHER REFERENCES

Rebstock et al.: "JACS," vol. 71 (1949), p. 2461.
Controvlis et al.: "JACS," vol. 71 (1949), p. 2468.
Phillips et al.: "JACS," vol. 72 (1950), pp. 4920–21.
Phillips et al.: "JACS," vol. 69 (1947), pp. 203–04.